United States Patent
Budai et al.

[15] 3,688,814
[45] Sept. 5, 1972

[54] MACHINE FOR USE IN THE MANUFACTURE OF GRINDING WHEELS

[72] Inventors: Robert E. Budai; Philip R. McDowell, both of Downsview, Ontario, Canada

[73] Assignee: G & B Automated Equipment Limited, Downsview, Ontario, Canada

[22] Filed: April 26, 1971

[21] Appl. No.: 137,294

[30] Foreign Application Priority Data

March 26, 1971 Germany..........P 21 14 641.8
March 26, 1972 Germany.........G 71 11 507.6

[52] U.S. Cl. ..................141/280, 118/413, 141/284, 425/219
[51] Int. Cl. ...........................................B28b 13/00
[58] Field of Search ......118/413; 141/125, 289, 284; 425/218, 219, 239, 426

[56] References Cited

UNITED STATES PATENTS

| | | |
|---|---|---|
| 2,749,006 | 6/1956 | Narvo........................141/125 |
| 3,107,702 | 10/1963 | Gex et al. ..................141/125 |
| 3,487,508 | 1/1970 | Baumgartner et al...........141/284 X |
| 3,605,825 | 9/1971 | Hermes..................141/280 X |

Primary Examiner—Edward J. Earls
Attorney—Peter Kirby, Norris M. Eades and Charles P. Curphey

[57] ABSTRACT

A machine with a work table in which a mold cavity is formed. A shuttle hopper discharges grinding wheel mix into this cavity while rotating. A deflecting blade below the shuttle hopper distributes the mix uniformly in the cavity and smooths the upper surface level with the top of the mold edge. The blade is generally spiral in shape, the inner portion thereof expanding from the axis of rotation so as to intersect radii at 55°.

4 Claims, 6 Drawing Figures

PATENTED SEP 5 1972 3,688,814

MACHINE FOR USE IN THE MANUFACTURE OF GRINDING WHEELS

REFERENCE TO OTHER APPLICATION

Reference is directed to U.S. Pat. application Ser. No. 821,720 filed May 5, 1969 now U.S. Pat. No. 3,599,283 of Robert E. Budai et al.

BACKGROUND OF THE INVENTION

This invention relates to a machine for use during the manufacture of grinding wheels.

As is well known grinding wheels are made by first compressing and subsequently firing a charge of granular material (mix) that has previously been prepared in accordance with the particular characteristics desired in the final wheel. There are resinoid mixes and vitrified mixes and many variations of minor ingredients. Such variations do not, however, alter the fact that the material of the mix, when ready for molding, will have a granular and yet somewhat tacky consistency. It is necessary for this material to be distributed throughout a mold which is then placed under the ram of a press, to be there subjected to high pressure and compacted to about half its original volume. The resulting semifinished grinding wheel is sufficiently firm to be handled at a unit, and is passed to a kiln or oven for baking.

The present invention is concerned with improvements in a machine for carrying out the preliminary step of mold filling.

The object of the invention is to improve the mold filling process by enabling the same to be carried out more quickly and reliably than has previously been possible.

Machines for this purpose are especially concerned with achieving uniformity of distribution of the mix material throughout the mold, such uniformity being important, since close tolerances must be achieved in the balance of the final product to avoid the appearance of destructive centrifugal forces when the wheel is rotated at high speed.

All grinding wheels are tested at 150 percent of rated speed before being used and numerous failures result from this test. One of the objects of the present invention is thus a reduction of this failure rate, coupled with an increase safety in those wheels that pass the test.

Another object of the invention is to provide a machine by which the step of mold filling is carried out rapidly, so as to yield a high hourly output rate, without any sacrifice in quality.

Further objects and advantages of the invention will be apparent from the specific description which follows, which description is to be read with the accompanying drawings. This specific description is, however, only provided by way of example of the present invention, the broad scope of which is defined in the appended claims.

BRIEF DESCRIPTION OF DRAWINGS

The accompanying drawings show apparatus for carrying the invention into practice, in which drawings.

OVERALL STRUCTURE OF THE MACHINE AND MOLD CAVITY

A complete machine for carrying out mold filling and compressing operations is disclosed in the abovementioned U.S. Pat. application Ser. No. 821,720 filed May 5, 1969 of Robert E. Budai et al. The present invention relates to improvements in the shuttle hopper mechanism of such a machine, and accordingly the present disclosure is limited to such shuttle hopper mechanism and the parts with which it is associated.

Figure 1:
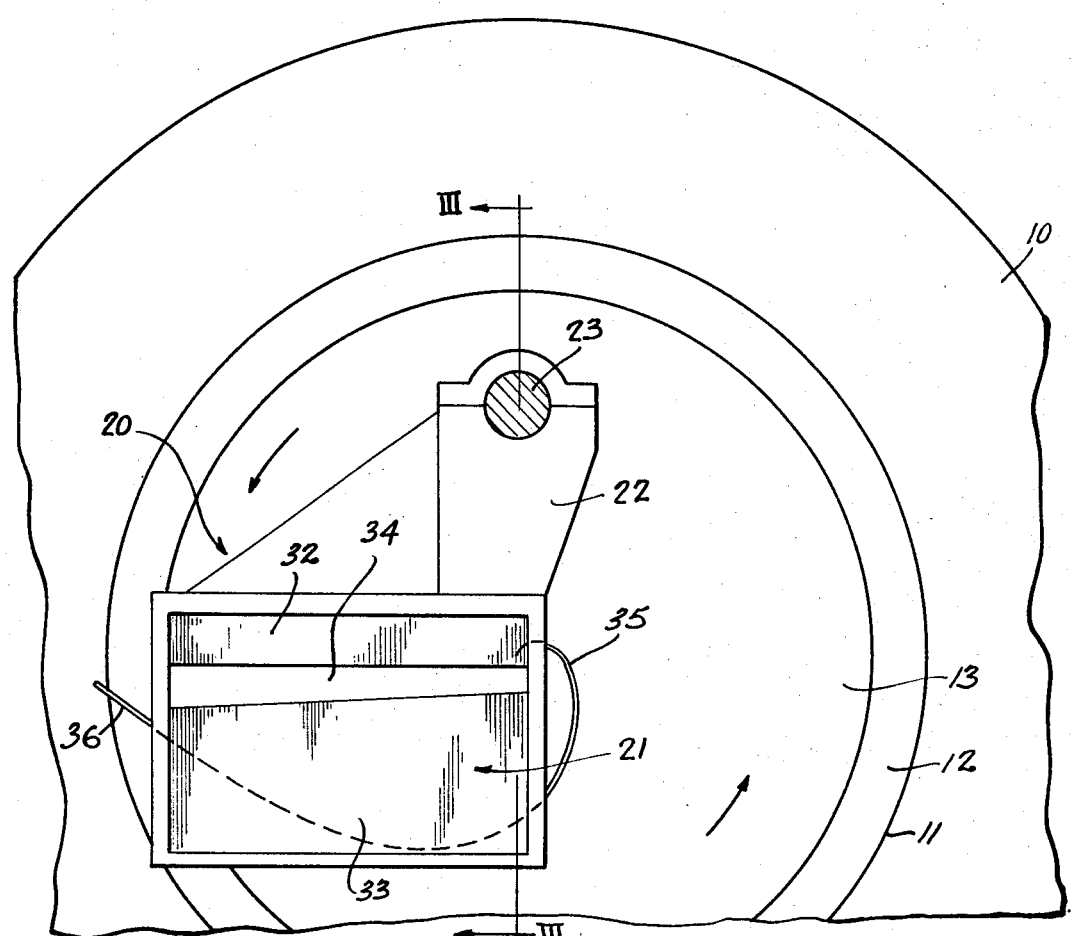
FIG. 1 is a plan view of a mold-forming table and of a shuttle hopper showing the same in relation to the table, the shuttle hopper being in its operative orientation, the view being taken on I—I in FIG. 3.
Figure 2:
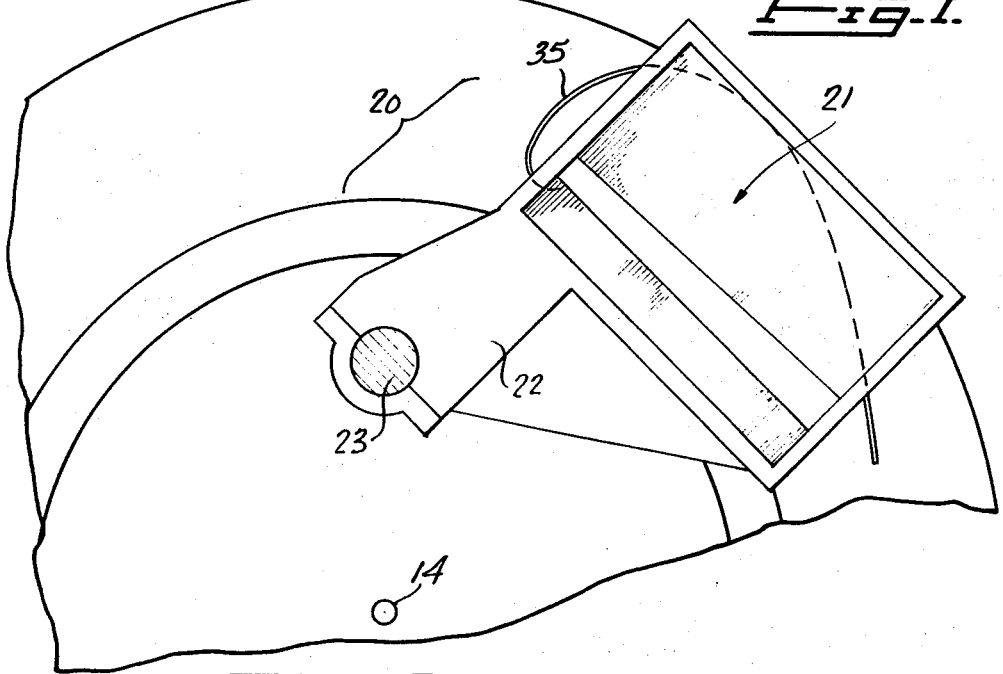
FIG. 2 is a view similar to FIG. 1, but with the shuttle hopper in a withdrawn orientation.

The machine will comprise a mold-forming table having a fixed horizontal table top 10, formed with a central circular cavity 11 within which a cylindrical mold band 12 is located. A bottom plate 13 occupies the space within the mold band 12, a center pin 14 (FIG. 2) being located at the center of the bottom plate 13. The bottom plate 13 is movable vertically within the mold band 12 (i.e., perpendicular to the plane of the paper on which FIGS. 1 and 2 are drawn) between a preliminary position in which the upper surface of the bottom plate 13 lies flush with the upper edge of at least about 90° and preferably the mold band 12, and an operative position in which the bottom plate 13 is lowered to form a mold cavity. The sides of this mold cavity are then defined by the band 12 and its bottom is defined by the plate 13. The center pin 14 does not move with the plate 13 and remains upwardly projecting at all times with its upper surface level with that of the band 12. After the mold cavity has been filled, the assembly consisting of the band 12, bottom plate 13 and pin 14 is removed as a unit from the cavity 11 in the table top 10 for transfer to a press and replacement by a new such assembly. When in position, the upper edge of the band 12 is flush with the table top 10.

THE SHUTTLE HOPPER

The function of the shuttle hopper mechanism 20 is to transfer a charge of mix material from a hopper 21 to the mold cavity formed within the mold band 12. The hopper 21 will have received the charge of mix material from an input hopper (not shown), which may be similar to the input hopper disclosed in said prior patent application.

The hopper 21 is mounted on one end of a first arm 22, the other end of which is secured to a spindle 23 that carries a pinion 24 meshing with a rack 25 slidable in a passage 26 of a second arm 27, movement of the rack 25 back and forth in this passage to turn the shuttle arm 22 being controlled by fluid pressure admitted to the appropriate end of the passage 26. The arm 27 is secured to a shaft 28 mounted to rotate in a fixed structural member 29 and driven by a motor 30.

The top edges 31 of the hopper 21 define a rectangular opening for receiving the charge from the input hopper, the side walls 32 and 33 of the hopper 21 sloping smoothly inwardly and downwardly to a discharge opening 34. Secured to a downward projection 38 at the under.surface of the hopper 21 is a smoothing blade 35. This blade is made of a firm, wear-resistant material, such as polyurethane and projects downwardly below the bottom edge of the opening 34.

OPERATION

Figure 3:
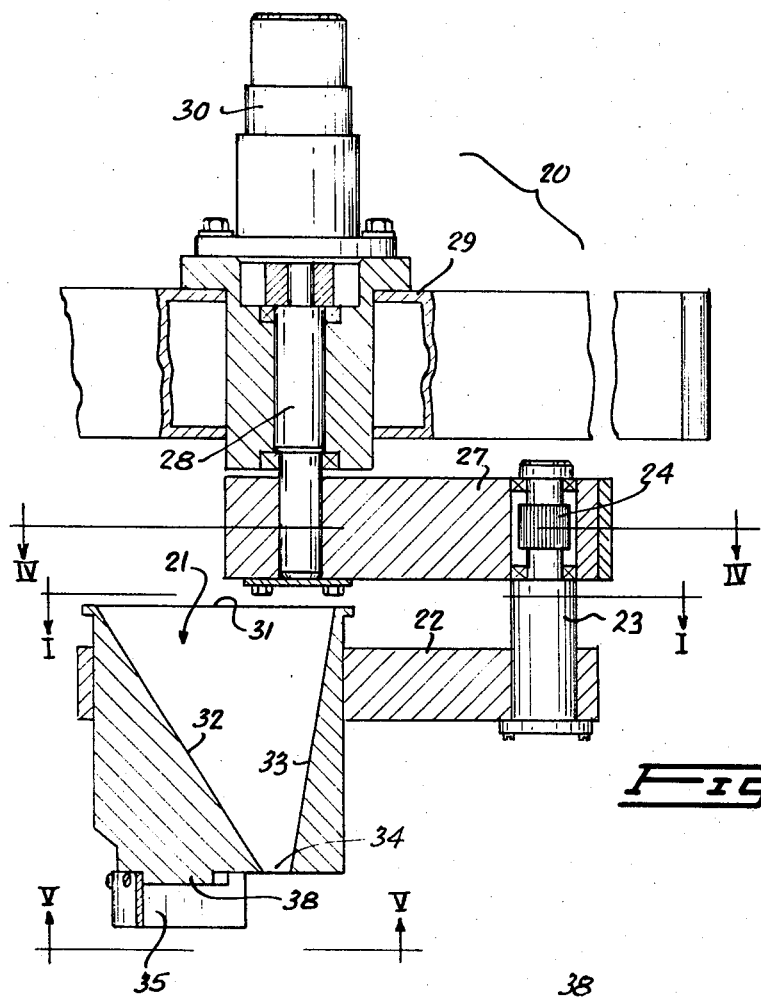
FIG. 3 is a sectioned, elevation view of the shuttle hopper and a mounting assembly therefor.
Figure 5:
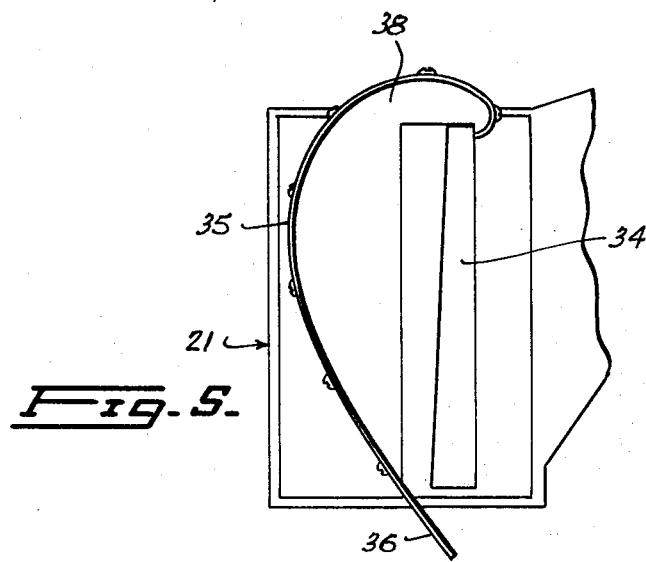
FIG. 5 is a view taken on the line V—V in FIG. 3.
Figure 4:
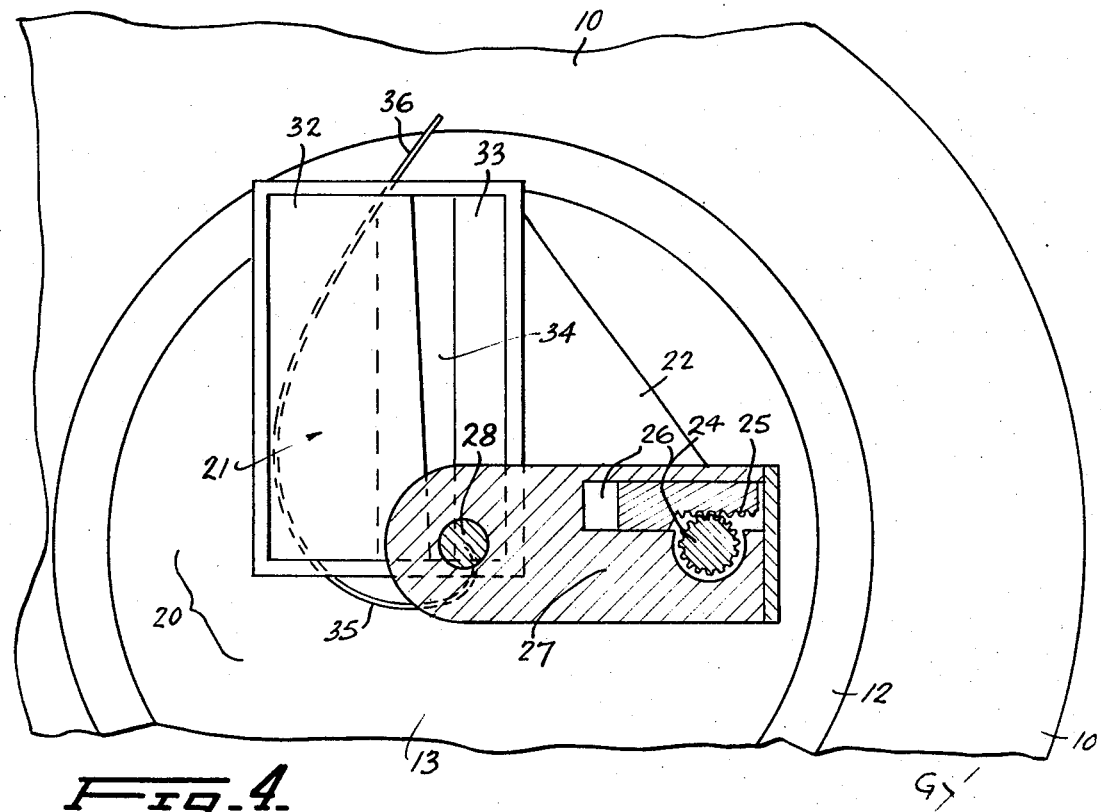
FIG. 4 is a section on the line IV—IV in FIG. 3.

A charge of mix material is transferred to the hopper 21 when this hopper is located at its innermost position with the two arms 22 and 27 lying above one another, that is the position shown in FIGS. 1, 3 and 4. The vertical axis defined by the shaft 28 now extends substantially through the axis of the center post 14.

With the position of the rack 25 held fixed, rotation of the shaft 28 by the motor 30 will cause the entire assembly to orbit around the center post 14, that is around the axis of the mold cavity formed within the mold band 12. The mix will fall through the opening 34 into the mold cavity and fill it up. As rotation continues any irregularities in the initial distribution of the mix in the cavity are overcome and a smooth surface is formed level with the top surface of the mold band 12 by the action of the blade 35. It will be noted from FIGS. 1 and 4 that the trailing end 36 of the blade rests on the mold band 12, which prevents the hopper 21 or its blade 35 entering the mold cavity. Also the innermost part of the blade 35 rests on the pin 14. Any excess of material, and normally a small excess will be provided for, is deflected by the blade 35 onto the table 10 beyond the mold band 12.

As demonstrated in FIG. 2, rotation of the shaft 23 will move the hopper 21 to a withdrawn position in which the blade 35 rests on the table 10. This withdrawn position is required for subsequent operations, when the band 12 carrying the mix that has been deposited in the mold cavity is withdrawn downwardly through the table 10 for transfer to the next stage in the process, namely to the press for compressing the material into a manageable blank.

SHAPE OF BLADE 35

Figure 6:
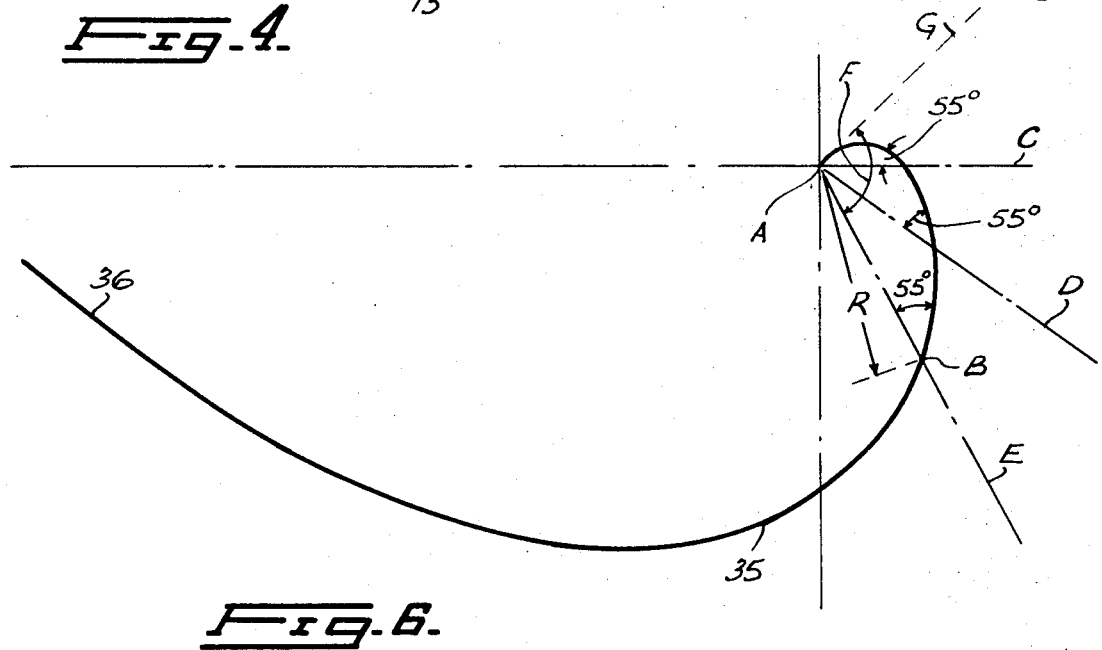
FIG. 6 is a diagram illustrating the geometry of a blade forming a part of the shuttle hopper.

The satisfactory and prompt performance of the distribution and smoothing process by the blade 35 is dependent upon its shape, which is generally spiral and is shown geometrically in FIG. 6. For the initial portion thereof, e.g., the first 3 inches of radius from the axis defined by the shaft 28 (which axis is coincident with the commencement location A of the spiral), i.e., approximately the radius R to the point B, the angle that the blade makes with each radius in turn, as exemplified by the radii C,D, and E is preferably 55°, or close thereto. It has been found that this angle is comparatively critical. Small deviations from the value of 55° can be tolerated, and it is realistic to say that the angle must be within the range of approximately 50° to approximately 60°. Nevertheless, the value of 55° has been found to be the optimum and will therefore be the angle normally selected for the important first few inches of the blade, i.e., at least as far outwardly as the point B.

Instead of defining the point B (at least out to which the selected angle of approximately 55° will be maintained) as having a radius of 3 inches, this point can be characterized as having a radius line E which makes an angle F with a tangent G at the commencement of the spiral of about 105°.

It has been found experimentally that, with this selected angle of approximately 55°, the deflecting and smoothing action of the blade is so effective that it is only necessary for the assembly to make about one and a half complete revolutions around the mold after the mix has been deposited therein to achieve the necessary accuracy of distribution and surface smoothing of the material. Only to have to turn the blade through one and a half revolutions compares very favorably with prior machines in which many more revolutions have been necessary before a satisfactory mix consistency and surface have been obtainable. Such improvement thus represents a substantial advantage in speeding up the process by enabling the machine to proceed to the next stage in the operation and vacate the cavity 11 in the table-top 10 for the introduction thereinto of a fresh mold band 12 containing an empty cavity to be filled with the next batch of mix material.

Outwardly of the point B on the blade 35, i.e., beyond the 3 inch radius, the blade may retain its angle to each radius of 55°, but this is no longer important. At first the angle will tend to increase and then to decrease again, the shape of the tail portion 36 being dictated mainly by the requirement for it to extend to and rest on the mold band 12, and thus to deflect material that has reached the tail portion as promptly as possible beyond the mold cavity. The tail portion 36 eventually becomes almost straight, still making an angle with a radius of about 55°.

It will be appreciated that the use of the 55° angle will mean that each portion of the rotating blade 35 having this relationship to a radius will momentarily encounter the mix material at an inclination of 35°, relative to the direction of travel of that portion of the blade, such direction of travel being taken as tangential to a circular arc drawn about the center A.

We claim:

1. A mold-filling assembly for use in the manufacture of grinding wheels for evenly distributing granular material into a cylindrical mold cavity provided in a horizontal table structure, said assembly comprising:
   a. a shuttle hopper defining a chamber for receiving said material and having a bottom opening for discharge of the same therefrom,
   b. a blade mounted on the shuttle hopper laterally of said opening to project downwardly therefrom, and
   c. means mounting said shuttle hopper in a filling position over said cavity with a portion of the blade resting on the table structure, for passage of the material through the opening into said cavity,
   d. said mounting means including means for rotating the shuttle hopper about a vertical axis extending substantially centrally of the cavity to orbit the opening and the blade around the cavity for even distribution and smoothing of the material in the cavity,
   e. said blade extending substantially as an expanding spiral outwardly from a commencement location on said axis, at least the initial portion of the spiral extending from said commencement location intersecting radii from said location at a selected angle lying within the range of 50° to 60°.

2. An assembly according to claim 1, wherein said selected angle is approximately 55°.

3. An assembly according to claim 1, wherein said initial portion extends at least to a point situated a distance out from the commencement location such that a radius from said location to said point makes an angle of at least 90° with a tangent to the blade at the commencement location.

4. An assembly according to claim 3, wherein the length of said radius from said location to said point is approximately 3 inches.

* * * * *